United States Patent [19]

Casberg

[11] Patent Number: 5,137,731
[45] Date of Patent: Aug. 11, 1992

[54] CHEMICAL TABLET WITH CENTRAL HOLE AND PARTIALLY EXPOSED TOP AND BOTTOM

[75] Inventor: John M. Casberg, Cheshire, Conn.

[73] Assignee: Olin Corporation, Cheshire, Conn.

[21] Appl. No.: 801,143

[22] Filed: Dec. 2, 1991

Related U.S. Application Data

[62] Division of Ser. No. 506,052, Apr. 9, 1990, abandoned.

[51] Int. Cl.⁵ ............................................. A61K 9/20
[52] U.S. Cl. .................................. 424/465; 424/76.8; 424/405
[58] Field of Search ............ 424/465, 76.7, 76.8, 424/405; 4/228, 227; 422/263, 265

[56] References Cited

U.S. PATENT DOCUMENTS

| | | | |
|---|---|---|---|
| 2,711,346 | 7/1955 | Irwin et al. | 422/263 |
| 3,856,932 | 12/1974 | May | 424/405 |
| 4,333,752 | 6/1982 | Thies et al. | 55/387 |
| 4,350,666 | 9/1982 | Klutts | 422/263 |
| 4,374,563 | 2/1983 | Alexander | 206/499 |
| 4,546,503 | 10/1985 | Casberg | 4/228 |
| 4,643,881 | 2/1987 | Alexander et al. | 422/265 |
| 4,704,118 | 11/1987 | Eckenhoff | 424/438 |
| 4,876,003 | 10/1989 | Casberg | 422/263 |

OTHER PUBLICATIONS

Design Application U.S. Ser. No. 07/503,590 filed Mar. 27, 1990, by J. M. Casberg.

*Primary Examiner*—Thurman K. Page
*Assistant Examiner*—D. Colucci
*Attorney, Agent, or Firm*—Ralph D'Alessandro

[57] ABSTRACT

A toroidal chemical tablet with a close fitting water impervious peripheral barrier surrounding its sides with exposed upper and lower annular surfaces is disclosed. The tablet has a central hole to aid in water flow and dissolves inside out for even feeding. Also disclosed is a pool chemical tablet partially encased in a covering which when placed in a pool skimmer gives a visual indication when the tablet is substantially dissolved, as well as methods for using the tablet.

20 Claims, 1 Drawing Sheet

CHEMICAL TABLET WITH CENTRAL HOLE AND PARTIALLY EXPOSED TOP AND BOTTOM

This application is a division of application Ser. No. 07/506,052, filed Apr. 9, 1990, now abandoned.

This application relates to tablets of a chemical such as a chlorine releasing solid compound. These tablets are particularly useful for the water treatment and sanitization of swimming pools.

BACKGROUND OF THE INVENTION

Tablets of pool chlorination compounds have been marketed for many years with varying degrees of success. One past attempt is that shown in U.S. Pat. No. 3,856,932 issued Dec. 24, 1974 to May which discloses a solid disk shaped tablet with a water impervious barrier around its outer edge so that the flat upper and lower exposed surfaces would hopefully dissolve at a relatively uniform rate. However, large sizes of the May tablet may tend to obstruct pool skimmels where many pool owners like to place such tablets in order to keep them away from swimmers and to have a relatively constant flow of water past the tablet. Large solid tablets of the May design would cause consumers worry about this possible blockage of skimmers. The slowness of feeding of the May tablet might require an unacceptably large diameter tablet in order to have sufficient surface area to achieve a desired feed rate. In addition the water barrier of May might tend to come off in use or, if it stays on, block the flowpath of water over the top of the tablet as it dissolves. Another past attempt was my own U.S. Pat. No. 4,546,503, issued Oct. 15, 1985 which also involved a 4" tablet, but with a central hole and a surrounding cup and special peripheral shape. However, the cup was large enough that it again presented a concern to many owners of pools who were afraid its size would constrict flow inappropriately in a skimmer. Thus a new approach to tablet design is needed to overcome the above problems while still allowing a large tablet which can last a relatively long time and dissolve at a relatively even rate.

SUMMARY OF THE INVENTION

The present invention solves the above problem by providing a pool chemical tablet which has a donut shape with a close-fitting peripheral water impervious barrier. The barrier is preferably of a certain size in relation to the tablet size and hole diameter to achieve a very even dissolving rate of a desired magnitude.

BRIEF DESCRIPTION OF THE DRAWINGS

The invention will be better understood by reference to the attached drawings in which.

DETAILED DESCRIPTION OF THE DRAWINGS

Figure 1:
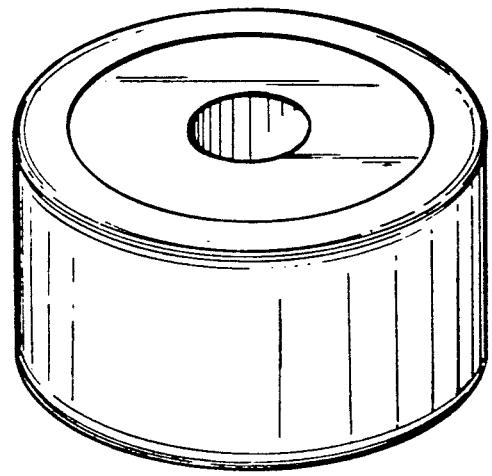
FIG. 1 is a front perspective view of a pool chemical tablet according to my invention.
Figure 2:
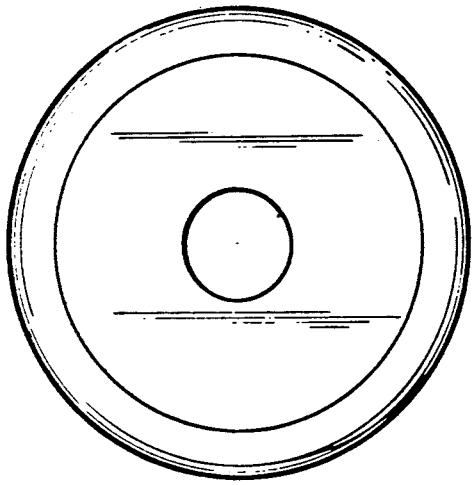
FIG. 2 is is a top plan view of the tablet of FIG. 1.
Figure 3:
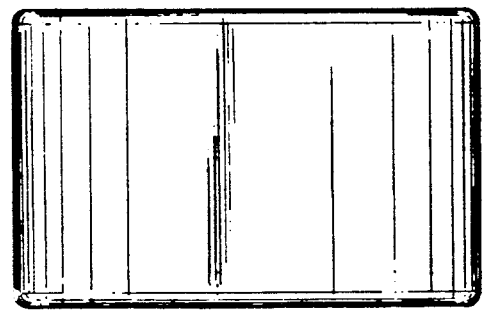
FIG. 3 is a side elevational view of the tablet of FIG. 1.
Figure 4:
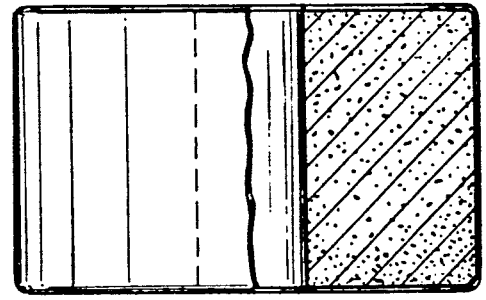
FIG. 4 is a partial diametrical cross sectional view of the tablet of FIG. 1.
Figure 1:
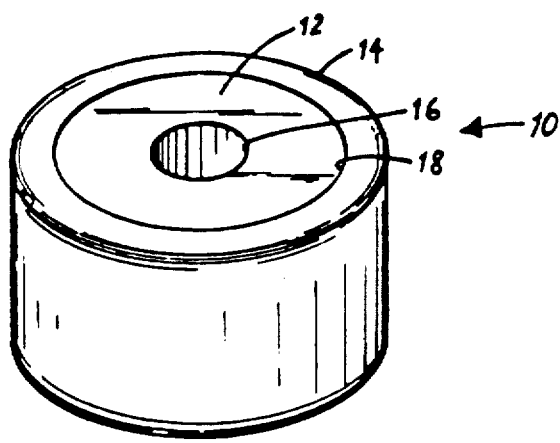
Figure 2:
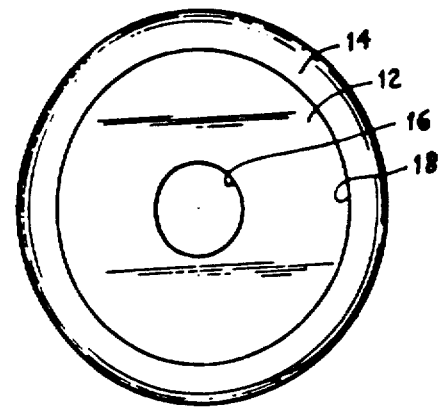
Figure 3:
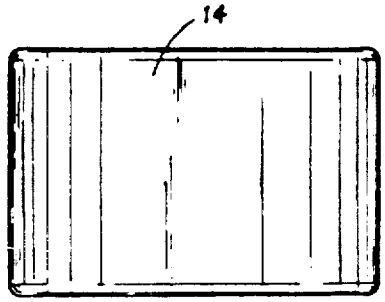
Figure 4:
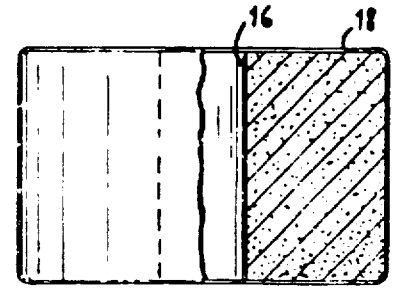

Referring first to FIG. 1, a pool chemical unit 10 is shown which embodies a preferred version of the tablet of the invention. Unit 10 includes a tablet 12 and a covering 14. Tablet 12 is a toroidally shaped body made of compacted pool chlorinating compound such as a relatively slowly dissolving triazine compound. Suitable compounds are those marketed under the trademark PACE ® or SUN ® by Olin Corporation of Stamford, CT. Tablet 12 is a compacted torus of pool chlorination chemical having an outer diameter of within the range of from about 3.5" to about 4.5", a thickness within the range of from about 2" to about 2.5" and a central hole 16 within the range of from about ¼" up to about 2" in diameter. The tablet tablet may have straight or rounded corners at the juncture of its upper and side surfaces.

Covering 14 is preferably a shrink wrapping of plastic material which when shrunk covers the sides and approximately the outer ¼" of the upper and lower annular surfaces to thereby leave exposed an annular area on the upper and lower surface having a maximum diameter 18 within the range of from about 2¾" up to about 3¾" to expose a percentage range of from about 61% to about 83% of the surface area of the upper and lower annular surfaces including the area of the central hole 16. It has been found that the size of the shrink wrap can be varied to adjust the dissolving rate to the desired level. This variation can be such as to provide an overlap of the upper surface of the tablet within the range of from about ¼" (just enough to be sure the shrink wrap is firmly attached so it will not slide off prematurely) up to 1¼". It is not necessary that the exposed portion of the upper and lower surface be concentric with the tablet, so that the shrink wrapping need not be precisely centered, although for aesthetic appearance concentricity would be preferred.

Another means of adjustment of dissolving rate is to increase or decrease the density or porosity of the compacted tablet. It is preferred that the tablet have a density of about 1.7 to 1.8 gm/cc, but a density within the range of from about 1.5 up to about 1.9 gm/cc would be acceptable. Yet another adjustment is the diameter of the central hole, which is preferably about 1" but can be from a ¼" up to about 2". It will be appreciated that all of the dimensions are interrelated so that varying one may require a corresponding variation in one or more of the other variables to achieve a desired feed rate.

The toroidal shape is unexpectedly superior in that the tablet dissolves from the inside toward the outside so that as the tablet dissolves the dissolving surface area increases due to the enlargement of the central hole and decreases due to the reduction in upper and lower annular surfaces and can therefore be tailored to a desired balance. This "inside out" dissolving pattern helps with water flow through the tablet, also. As the hole enlarges due to the dissolving occurring, the flow through the tablet increases, thereby making skimmer obstruction less likely. In addition, the hole through the tablet eliminates the potential for a stagnant area inside the water barrier due to the tablet dissolving to a lower elevation than the surrounding barrier (as would be the case in the May tablet referred to earlier). The barrier wraps over the upper surface of the tablet to thereby help prevent water from flowing between the tablet and the barrier (as might be the case with the May tablet where the tablet-barrier interface is exposed).

In addition an unexpected result was noted during testing of the tablet of the invention. When the tablet reaches a near fully dissolved state, the shrink wrapping begins to pick up and collect bubbles from the skimmer and rotates about 60 to 90 degrees thus providing a ready indication that it is time to replace the tablet with a new one.

Having now described a preferred embodiment of the invention, it will be understood that the tablet may be modified in minor ways without departing from the scope of the invention. For example the water impervious barrier can be of any desired rigidity or flexibility and any desired thickness, although semi-rigidity is desirable to prevent the barrier from being sucked through the skimmer if the skimmer basket or screen is removed with the tablet in the skimmer (an improper and rare event). The barrier may be of a lower density material such that it would float when not weighted down by undissolved tablet chemical, thus giving an indication that the tablet is ready for replacement. Also the tablet may be of any desired height as determined by the feed rate desired, although for an even feed rate it is thought that a ratio within those specified for the preferred embodiment will be best.

While the invention has been described above with reference to the specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A chemcial tablet having upper and lower annular surfaces connected by a side surface at junctures with the upper and lower annular surfaces, the upper and lower annular surfaces being partially encased in a plastic covering, the upper and lower annular surfaces having from about 61 to about 83 percent of their surface area exposed, the tablet further having a density of from about 1.5 to about 1.9 grams per cubic centimeter such that when the table is placed on the bottom of a pool skimmer the tablet substantially dissolves completely from within the covering and collects gas bubbles within the covering adjacent the junctures to rotate the covering from about ;0 to ;out 90 degrees to provide a visual indication wh the tablet is substantially dissolved.

2. The tablet of claim 1 wherein the covering is less dense than water.

3. The tablet of claim 1 wherein the tablet has a side, top and bottom and the covering encloses the side of the tablet and an outer portion of the top and bottom so as to catch air bubbles and rotate the tablet when the tablet is substantially dissolved.

4. The table of claim 3 wherein the cover captures the air bubbles flowing thereinto and the rotation is in response to the buoyancy provided by the air bubbles.

5. The tablet of claim 1 wherein the covering is a shrink wrapped plastic.

6. The tablet of claim 1 wherein the tablet is toroidal.

7. A method of chlorinating a body of water which comprises the steps of:
    (a) attaching a plastic covering device to a chlorination tablet having a density of from about 1.5 up to about 1.9 grams per cubic centimeter and upper and lower annular surfaces connected at junctures to a side surface, the covering device exposing from about 61 to about 83 percent of the surface area of the upper and lower annular surfaces and being visually detectable and usable to indicate when the chlorination tablet is nearly fully dissolved;
    (b) introducing the covering device and attached chlorination tablet into a body of water;
    (c) dissolving a portion of the tablet in the water to thereby chlorinate the water; and
    (d) activating the covering device in response to the tablet becoming substantially completely dissolved by collecting gas bubbles within the covering device adjacent the junctures to cause the covering device to rotate from about 60 to about 90 degrees to thereby give an indication that the table tis ready to be replaced.

8. The method of chlorination wherein the introduction step includes introducing the covering device and tablet into a swimming pool skimmer.

9. The method of chlorination of claim 7 further including the step of:
    (e) moving the tablet to the water surface in response to the activation of the covering device.

10. The method of chlorination of claim 9, wherein the activation and moving steps include the substep of capturing air bubbles in the covering device, to thereby float the remaining undissolved portion of the tablet to the water surface.

11. The method according to claim 7 further comprising using the covering device to partially encase the chlorination tablet.

12. The method according to claim 11 further comprising using a covering device that is less dense than water.

13. The method according to claim 12 further comprising using a shrink wrapped plastic as the covering device.

14. The method according to claim 13 further comprising the covering device encasing the side and an outer portion of the top and bottom of the chlorination tablet the covering catching air bubbles as the tablet dissolves during the activation step to rotate the tablet and the covering when the tablet is substantially dissolved.

15. The method according to claim 14 further comprising suing a toroidally shaped tablet.

16. A chemical tablet containing a triazine compound having upper and lower annular surfaces connected by a side surface at junctures with the upper and lower annular surfaces, the upper and lower annular surfaces being partially encased in a plastic covering, the upper and lower annular surfaces having from about 61 to about 83 percent o their surface area exposed, such that when the tablet is placed on the bottom of a pool skimmer the tablet substantially dissolves completely from within the covering and collects gas bubbles within the covering adjacent the junctures to rotate the covering from about 60 to about 90 degrees to provide a visual indication when the tablet si substantially dissolved.

17. The table of claim 16 wherein the table t has a side, top and bottom and the covering encloses the side of the tablet and an outer portion of the top and bottom so as to catch air bubbles and rotate the tablet when the tablet is substantially dissolved.

18. The tablet of claim 17 wherein the covering captures the air bubbles flowing thereinto and the rotation is in response to the buoyancy provided by the air bubbles.

19. The tablet of claim 16 wherein the tablet is toroidal.

20. The tablet of claim 16 wherein the covering is a shrink wrapped plastic.

* * * * *

UNITED STATES PATENT AND TRADEMARK OFFICE
CERTIFICATE OF CORRECTION

PATENT NO. : 5,137,731

DATED : August 11, 1992

INVENTOR(S) : John M. Casberg

It is certified that error appears in the above-identified patent and that said Letters Patent is hereby corrected as shown below:

In the drawings, the reference numerals and their lead lines should appear in each of the figures as shown on the attached page.

Signed and Sealed this

Second Day of November, 1993

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,137,731

DATED : August 11, 1992

INVENTOR(S) : John M. Casberg

It is certified that error appears in the above-identified patent and that said Letters Patent is hereby corrected as shown below:

In column 1, at line 21 please delete "skimmels" and insert --skimmers-- in its place and at line 27 please delete "unaccepla-" and insert --unaccepta--- in its place;

In column 3, at line 39 please delete "table" and insert --tablet-- in its place and at line 53 please delete "table" and insert --tablet-- in its place;

In column 4, at line 12 please delete "table tis" and insert --tablet is-- in its place; at line 42 please delete "suing" and insert --using-- in its place; at line 49 please delete "o" and insert --of-- in its place; at line 54 please delete "si" and insert --is-- in its place and at line 55 please delete "table" (first occurrence) and insert --tablet-- in its place and please delete "table t"(second occurrence) and insert --tablet-- in its place.

Signed and Sealed this

Twenty-first Day of December, 1993

Attest:

BRUCE LEHMAN

Attesting Officer     Commissioner of Patents and Trademarks